US006865972B1

(12) United States Patent
Sipe

(10) Patent No.: US 6,865,972 B1
(45) Date of Patent: Mar. 15, 2005

(54) ATTENUATOR FOR DISC BRAKE ROTOR MACHINING TOOL

(76) Inventor: Brian K. Sipe, 26684 Evergreen Ave., Murrieta, CA (US) 92563

( * ) Notice: Subject to any disclaimer, the term of this patent is extended or adjusted under 35 U.S.C. 154(b) by 0 days.

(21) Appl. No.: 10/636,419

(22) Filed: Aug. 6, 2003

(51) Int. Cl.⁷ ................................................ B23B 5/04
(52) U.S. Cl. ............................ 82/112; 82/163; 409/141
(58) Field of Search ............ 82/112, 163, 162; 408/17, 408/143; 409/141; 74/574

(56) References Cited

U.S. PATENT DOCUMENTS

| 4,531,434 A | * | 7/1985 | Vasquez | 82/152 |
| 6,227,085 B1 | * | 5/2001 | Vasquez, Jr. | 82/163 |
| 6,591,720 B1 | * | 7/2003 | Greenwald et al. | 82/112 |

* cited by examiner

Primary Examiner—Willmon Fridie, Jr.
(74) Attorney, Agent, or Firm—Trojan Law Office

(57) ABSTRACT

An improved attenuator for damping vibrations and noise when disc brake rotors are being machined in a machining lathe. The improved attenuator has a handle comprised of a squared end with legs extending at angle of 100° to the squared end toward each other. Damping pads are mounted on the ends of the legs to press against the surfaces of the rotor being machined. The 100° angle of the legs toward each other improves the biasing force against the rotor surfaces. Additionally, the damping pads are provided with a notch that fits around and over the tips of cutting bits of the machining lathe to securely hold the pressure pads in place. Another improvement includes a fastening strap attached to the squared end of the handle that wraps around a biasing spring and the carriage on the machining lathe to securely hold and maintain the position of the attenuator.

17 Claims, 2 Drawing Sheets

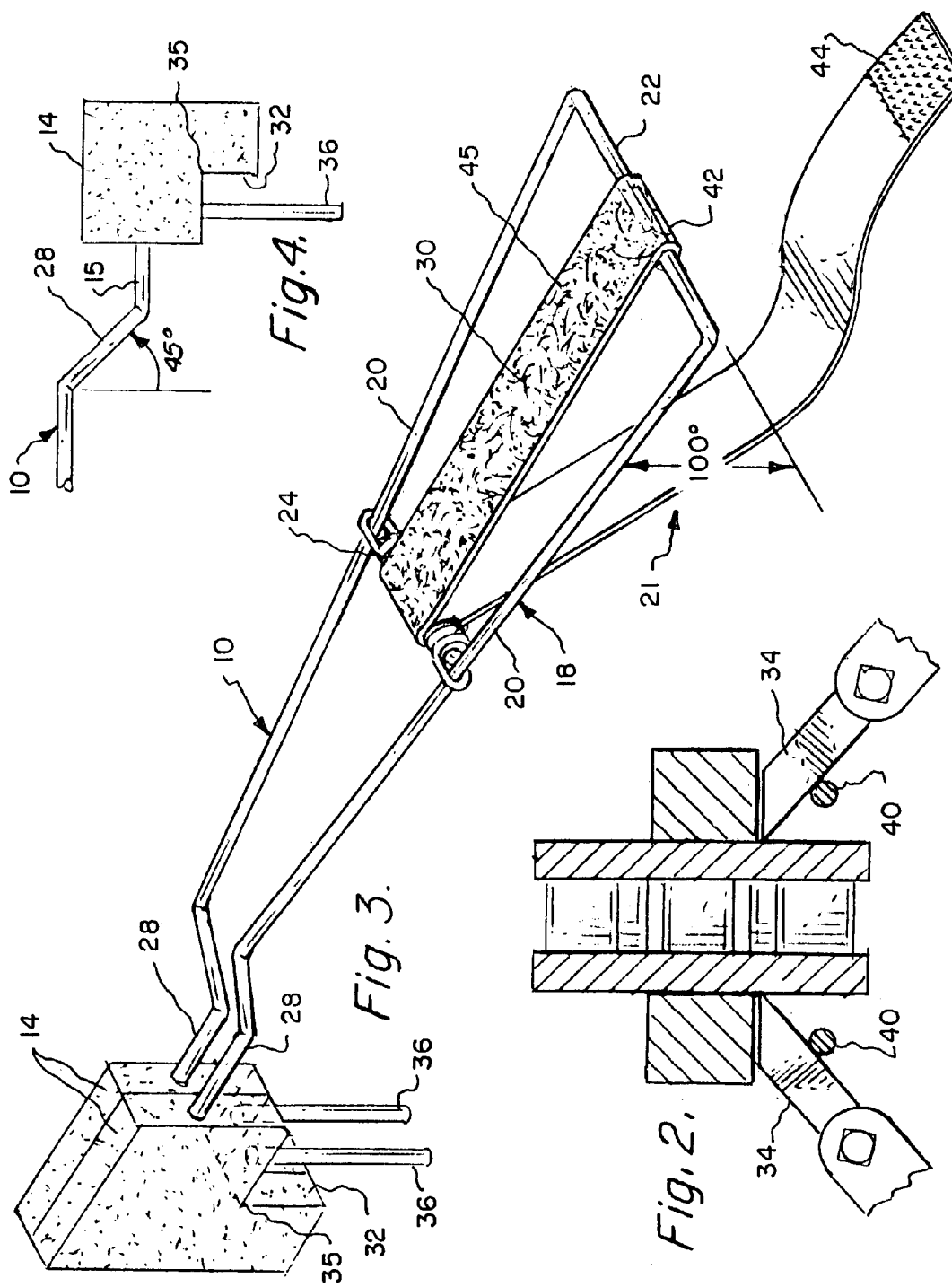

ATTENUATOR FOR DISC BRAKE ROTOR MACHINING TOOL

BACKGROUND OF THE INVENTION

1. Field of the Invention

This invention relates to an improvement for an attenuator to clamp vibrations and noise occurring when remachining or resurfacing a disc brake rotor by a pair of cutter bits in a machining tool or lathe.

2. Background Information

The faces of disc brake rotors become worn and damaged after long periods use. They must be machined to provide a smooth surface to improve braking. The machining of the disc brake rotors is done by placing them in a lathe machine where they are clamped in place and then machining opposite sides simultaneously with cutter bits as the brake rotor is rotated in the machine. Previously this machining technique caused a great deal of vibration and noise from the metal-on-metal affect of the cutting bits engaging the surfaces of the rotor. The noise produced by this machining is not only unpleasant for the machining tool operator and others in the area, but also can produce vibrations that adversely affect the machining.

For this reason, an attenuator disclosed and described in U.S. Pat. Nos. 4,531,434 and 6,227,085 of Vasquez issued Jul. 30, 1985 and May 8, 2001, respectively, was conceived to dampen and attenuate the noise and vibrations caused during the machining process. The vibration attenuator of these patents is comprised of a pad assembly including a pair of pads adapted to rest in frictional engagement against opposite faces of the disc brake rotor. They also rest on the tips of the cutter bits with biasing means urging the pads against the rotor faces. The pads are pressed against the faces of the rotor whereby rotation of the rotor in the brake lathe forcibly urges the pads against the lathe cutter bits. This close association of the attenuator with the pads and the cutter bits acts to attenuate vibration as well as that of the rotor. Each pad on the attenuator carries an element which projects into engagement with cutter bits. Movement of the cutter bits in a cutting direction causes the pad elements to be carried by the bits in turn movement of the pad in common with the cutter bits. Preferably the vibration attenuator the pads are pivotable through 180° to allow a fresh wearing surface to be applied to the cutter bits and the surfaces of the rotor.

Other systems employed to damp such vibrations include pads designed to bear against opposite faces of the rotor out of the way of the cutter bits. The pads are carried by a complex mounting structure secured to the brake lathe. Precise arrangement or adjustment of the position of the pads is required and elaborate linkage arrangement is provided to accompany the adjustment. This adjustment is relatively complex and costly.

Another system utilizes a resilient band adapted to be stretched and placed upon the circumference of the rotor. A set of such bands must be purchased to accommodate the various sizes of rotors to be machined. This system is unsatisfactory because attenuation is inadequate and the additional bands to accommodate various size of roller to be machined must be purchased.

It is therefore one object of the present invention to provide an improved attenuator for disc brake rotor, a machining tools or lathe.

Yet another object of the present invention is to provide an improved attenuator for disc brake rotor machining tools having biasing arms angled downward at approximately 45° toward the machining tool cutting bits to increase stability.

Yet another object of the present invention is to provide an improved attenuator machining tool having silencing pads with notch cut out of the pads to allow them to fit around and rest on top of cutter bits regardless of the adjustment of the cutter arms.

Still another object of the present invention is to provide an attenuator for attenuating the vibration and noise of cutter bits when machining a disc brake rotor in which a handle with a pair of legs biases damping pads against the surface of the disc brake rotor in which the legs of the handle extend from a squared end and toward each other so they subtend an angle relative to the squared end that is greater than 90°.

Yet another object of the present invention is to provide a strap that is attached to the straight portion on the squared end of the handle that allows the tool to be conveniently fastened to the carriage of the machining tool or lathe.

BRIEF DESCRIPTION OF THE INVENTION

The purpose of the present invention is to provide an improvement to a noise and vibration attenuator for damping vibrations and noise during the machining of disc brake rotors.

The present invention is for an attenuator that provides an improvement to the attenuators disclosed and described in U.S. Pat. Nos. 4,531,434 issued Jul. 30, 1985 and 6,227,085 issued May 8, 2001 and incorporated herein by reference. Each of these patents disclose and describe a vibration attenuator comprised of a pair of pads secured to the free ends or legs of a U-shaped handle having a curved end from which extend a pair of legs. At the distal ends of each of these legs a pair of damping pads are mounted for frictional engagement with opposite faces of a disc brake rotor being machined. The resiliently biasing legs of the handle bias the pads firmly against the surface of the rotor with a side of the pads abutting the top of cutter bits on the machining lathe that machines the surface of the rotor.

The pads are positioned on the legs of the handle such that as they are pressed against the surface of the disc rotor so that the rotation tends to force the pads down against the upper surface of cutter bits. This helps to prevent vibration on chattering of the cutter bits as they are machining surface of the disc rotor while at the same time the pads decrease the vibrational noise from the machining operation.

The present invention improves upon the prior devices by providing a squared end on the handle with the legs extending toward the pads and each other. The bend at the end of the handle with the squared or straight end is so that the legs bring the two pads together when not on the machine and subtends an angle relative to the straight end that is greater than 90°. In the preferred embodiment, the angle at the straight end of the handle, the legs subtend, is approximately 100°.

This construction of the handle increases the biasing force of the pads against the disc rotor surfaces and also resist the loss of elasticity of the handle. By providing a squared end to the handle and legs angled toward each other so they subtend an angle of about 100° to the straight end, they resist a loss of "elasticity" and maintain a higher pressure over a longer period of time.

This new construction on the end of the handle replaces the previously curved design replacing a looped radius of approximately two inches with two 100° bends approximately on each end of a straight piece that is approximately two inches long. This focuses the memory metal into two points instead of throughout the curvature of a loop. In return the pressure of the pads against the surface of the disc rotor is increased from two compression methods. The pressure is thus applied not only through the spring between the legs as in the prior patents referred to hereinabove but also by the two 100° bends. This provides two methods of applying pressure rather than just the single compression point of the spring. As a result, the attenuator sometimes, called a silencer, is stronger without having to increase the strength of the spring spanning the legs on the handle or by using a more expensive, stronger metal for the loop. The new design also resists distortion of the loop when adjusting the spring commonly known as "blowout". When the original curved loop on the handle while squeezed to adjust the spring the loop on the handle would sometimes collapse under the pressure.

The consequences of this result known as "blowout" is the curvature or looped diameter is reduced at the end of the handle making the loop radius smaller causing a reduction in pressure on the attenuating pads. This results in an improper fit of the unit to the cutting bits and rotor reducing the effectiveness. The new design of a squared end replaces the current curved loop design. This also can result in a decrease in the cost of manufacture by allowing the use of less expensive quality raw materials without losing compression strength or reducing the quality of the attenuator.

In addition to the improvements by squaring the end of the handle to provide increased pressure and resist loss of elasticity, the system also provides pressure pads that are notched at a rearward end. The notch is approximately a 90° notch providing a squared corner fitting over the top and side of the cutter bits. This is an improvement over the design described in U.S. Pat. No. 6,221,085 referred to hereinabove that uses a nub to engage the head of a bolt fastening cutter bits to cutter arms.

With the embodiments disclosed herein where there is a 90° notch at a rear end of the pressure pads in addition to the pads resting against the face of the disc brake rotor, the notch in the attenuating pads fit over and on top of the cutting bits. The notch plus pins in the notch that fit behind the cutter bits provide better chip deflection and a firmer more positive fit against the cutter bits and brake rotor surfaces. The damping pads with the notch fit on top of and around the cutting bits no matter how the cutting arms are adjusted.

As before, pins are provided between a surface of the notch and the space in which the cutting bits will fit. This helps to securely hold the pads in position on top of the cutter bits.

To revive the function disclosed in one of the prior patents of allowing the pads to be reversed when one side is worn, a symmetrical notch on the top of the attenuating pads could also be provided.

Another optional but preferred feature of the invention is to change the 90° bend shown in the 6,227,085 patent to a pair of 45° bends downward and toward the cutter bits on each leg. These 45° bends lower the point of gravity on the cutting head by bringing the pads closer to the cutting tips. This improves the stability of the attenuator and allows for a more precise cut.

Still another optional but preferred feature of the invention is the addition of a strap to hold the attenuator securely on the machining tool or cutting lathe. The cutting lathe can be one similar to that produced and manufactured under the trademark AMMCO. Most machining lathes as in this one have a carriage for mounting the cutter bits with bit adjustment knobs to adjust the position of the bits against the surface of the disc brake rotor. An improvement to the attenuator is to provide a strap that securely fastens the handle of the rotor around a portion of the lathe carriage between bit adjusting knobs. This is also another advantage of using the squared end of the handles to allow the strap to be securely fastened to the straight portion of the squared end and wrap around a portion of the carriage and be securely fastened to hold the attenuator in place.

The above and other objects, advantages, and novel features of the invention will be more fully understood from the following detailed description and the accompanying drawings, in which:

BRIEF DESCRIPTION OF THE DRAWINGS

FIG. 2 is a sectional view taken at 2—2 of FIG. 1.

FIG. 3 is isometric view of an improved attenuator for use on disc brake rotor machining lathes.

FIG. 4 is a partial sectional side view of the improved attenuator of FIG. 3.

DETAILED DESCRIPTION OF THE INVENTION

Figure 1:
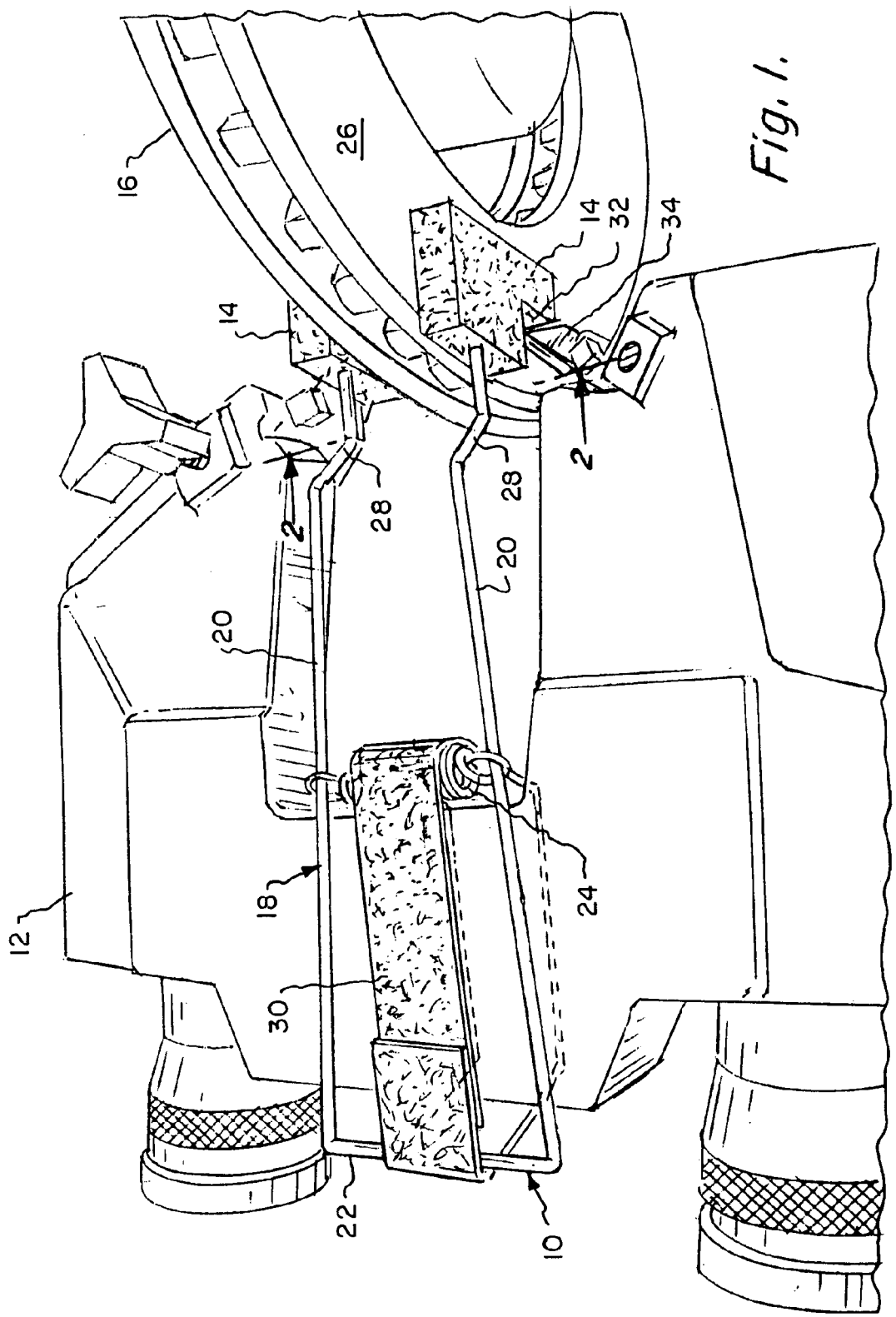
FIG. 1 is a partial sectional view of a machining lathe for machining disc brake rotors with the improved attenuator attached.

The improved attenuator 10 of the invention is shown attached to a machining lathe 12 (such as an AMMCO lathe) shown in partial section in FIG. 1. Attenuator 10 is comprised of pressure pads 14 that engage surfaces 26 on either side of a disc brake rotor 16 and are held in place by handle 18 having legs 20 extending from a squared or straight end 22. Attenuating pads 14 abutting the surface on opposite sides of disc brake rotor 16 are firmly biased by the flexible legs 20 and spring 24 spanning the legs. The elasticity of legs 20 plus the force of the spring 24 biases the attenuating pads 14 against the surfaces 26 on either side of disc brake rotor 16.

Attenuator 10 is improved by providing a squared end in straight bar 22 with legs 20 at a predetermined angle as well as including a 45° downward angled portion 28 at each end of legs 18 adjacent to pads 14. In addition a strap 30 is provided to securely fasten and hold the attenuator 10 in place on the machining lathe as will be described in greater detail hereinafter. Pads 14 are provided with a notch to securely hold attenuating pads 14 in place around cutter bits 34 as will also be disclosed in greater detail hereinafter.

The construction and design of the improved attenuator is illustrated more clearly in FIGS. 3 and 4. Attenuator 10 has handle 18 comprised of legs 20 and squared or straight end 22. In the preferred attenuator 10, legs 20 on handle 18 are at an angle to straight end 22 which is greater than 90°. Preferably, legs 20 and subtend an angle of approximately 100° as indicated at 21 toward each other. Legs 20 also have a pair of approximately 45° bends down and toward pads 14 at 28. These 45° bends at 28 illustrated in FIG. 4 increases stability of the attenuator when mounted on a machining lathe and allow for a more precise cut.

A combination of the squared end of handle 18 with legs 20 subtending angles of 100° to straight end 22 and biasing spring 24 positioned approximately midpoint on legs 20 provide a distinct improvement by increasing the pressure and resisting loss of "elasticity" while maintaining the higher pressure. This provides the attenuator with a longer life and also prevents what is known as "blowout". The squared end and the 100° angles of the legs to the straight portion 22 focus the metal memory into two points instead of throughout the curvature of a loop as in the prior devices. This in return increases the pressure of the pads against the surfaces 26 on either side of rotor 16 using two compression methods rather than a single compression method as in the previous design. That is, the pressure created by spring 24 in addition to the pressure created by the 100° bend of legs 18 toward each other. This allows for a stronger attenuator without having to increase the strength of spring 24 or using a more expensive metal for handle 18. The improved design also prevents distortion of the curved loop of prior handles when adjusting the spring commonly known as "blowout". In prior devices using a curved end or loop to handle, it would sometimes collapse when the loop was squeezed to adjust the spring. That is, the end of the handle or loop portion would collapse under the pressure.

The consequences of this is that the loop diameter may be reduced reducing the size of the loop causing the loss of pressure on the attenuating pads 14. This results in an improper fit of the unit to the cutter bits and disc brake rotor reducing the effectiveness. The new design of a squared end to the attenuator handle replaces the current loop design. This also decreases the cost by allowing the use of less expensive raw materials without losing compression strength or reducing the quality of the attenuator.

Another optional but preferred feature improving the effectiveness of the attenuator design is the inclusion of notches 32 in each pressure pad 14 at the rear end adjacent to the ends of legs 28 on handle 18. These notches provide a more positive engagement of the pressure pads on cutter bits 34 as will be described in greater detail hereinafter. These notches replace the nubs disclosed and described in the U.S. Pat. No. 6,227,085 patent referenced hereinabove. Notches 32 provide corners 35 for receiving the upper surface of cutter bits as shown in FIG. 2. As was described in one of the prior patents mentioned hereinabove, pins 40 fit behind cutter bits 34 while the end of cutter bits 34 fit into corners 35 of notches 32. This help retain pressure pads 14 in place against surfaces 26 of disc brake rotor 16 and helps attenuator 10 riding up on the disc brake rotor.

Notches 32 allow pads 14 to fit securely around and rest on top of cutter bits 34. The improvement provides better chip deflection and a firmer fit against disc brake rotor surfaces. The pads will rest on top of and around cutter bits 34 regardless of the adjustment of the cutter arms.

Another optional but preferred feature of the invention is the inclusion of strap 30 for fastening the attenuator 10 to the carriage 12 of a disc brake rotor machining lathe. Strap 12 is fastened to straight or square end 22 of attenuator 10 so that it can be retained when the attenuator is removed from the machining lathe. Preferably fastening strap 30 has a tubular end 42 that fits over the cylindrical rod forming square end 22. Alternately, it could be wrapped around and fastened in any convenient manner. Strap 30 is made long enough to fit around spring 24 beneath carriage 12 and completely wrap around it to be fastened against itself preferably by hook-and-loop material 44 known as Velcro.

The combination of the squared end of attenuator 10 with arms at approximately 100° to straight end 22, the notch fitting around the bit and the strap 30 attenuator 10 is firmly held in place against surfaces 26 of disc brake rotor 16 while being machined by lathe bits 34.

Obviously as described in patents mentioned hereinbefore, pressure pads 14 can be mounted on legs 18 at ends 15 so that they can be rotated to provide an additional surface if desired. In this case, another notch (not shown) like notch 32 would be provided in an upper end of pressure pad 14 if desired.

Thus there has been disclosed an improved disc brake rotor machining tool attenuator that is more reliable and precise than previously provided. The attenuator has the improvements of legs extending from a square end subtending an angle of approximately 100° so they are slightly angled toward each other to provide greater biasing force against the damping pads while at the same time resisting weakening at the end of the handle formed by the legs and the squared end. Additionally the damping pads are provided with a notch on one corner so that pressure pads fit on top of and around machine lathed cutting bits which fit into the corners of the pressure pads. Pins mounted in the pressure pads also are placed in the notch so that the attenuator is firmly held in place around the cutting bits by the corner of the notch and the placement of the pins.

This invention is not to be limited by the embodiment shown in the drawings and described in the description which is given by way of example and not of limitation, but only in accordance with the scope of the appended claims.

What is claimed is:

1. A device for attenuating vibrations and noise during the machining of a disc brake rotor comprising;
    a handle having a pair of legs;
    a pair of pressure pads mounted on the end of said legs;
    said pair of pressure pads having a notch for fitting on top of and around cutting bits of a machining lathe a spring spanning said legs for biasing said pressure pads against surfaces of said disc brake rotor;
    whereby said pressure pads are firmly held in place on top of said cutting bits.

2. The device according to claim 1 in which said notch is in a lower rear portion of said pressure pads that fit on top of and around said cutter bits.

3. The device according to claim 2 in which said notch has a depth approximately equal to one half the width and a height that is less than one half the length of said pressure pads.

4. The device according to claim 3 including pins in said notches in said pressure pads adapted to fit behind said cutter bits.

5. The device according to claim 4 in which said handle has a square straight end and a pair of legs that extend from said square end toward each other.

6. The device according to claim 5 in which said legs extend from said squared straight end at an angle outside said handle greater than 90°.

7. The device according to claim 6 in which said legs extend from said squared straight end at an angle outside said handle that is approximately 100°.

8. The device according to claim 7 in which a portion of said legs adjacent said pressure pads extend downward and toward said pressure pads at a pair of angles of approximately 45°.

9. The device according to claim 8 including a strap for securing said attenuator to a carriage of a machining lathe.

10. The device according to claim 9 in which said strap is fastened to said squared straight end of said handle.

11. The device according to claim 10 in which said strap wraps around said spring and said carriage and is fastened by hook-and-loop material.

12. The device according to claim 1 in which said handle has a square straight end and a pair of legs that extend from said square end toward each other.

13. The device according to claim 12 in which said legs extend from said squared straight end at an angle outside said handle greater than 90°.

14. The device according to claim 13 in which said legs extend from said squared straight end at an angle outside said handle that is approximately 100°.

15. The device according to claim 1 including a strap for securing said attenuator to a carriage of a machining lathe.

16. The device according to claim 15 in which said strap is fastened to said squared straight end of said handle.

17. The device according to claim 16 in which said strap wraps around said spring and said carriage and is fastened by hook-and-loop material.

* * * * *